United States Patent
Vonhoff

(10) Patent No.: US 8,210,711 B2
(45) Date of Patent: Jul. 3, 2012

(54) LIGHT

(75) Inventor: Jürgen Vonhoff, Osnabrück (DE)

(73) Assignee: IBV Holding GmbH, Osnabrück (DE)

( * ) Notice: Subject to any disclaimer, the term of this patent is extended or adjusted under 35 U.S.C. 154(b) by 357 days.

(21) Appl. No.: 12/444,882

(22) PCT Filed: Oct. 8, 2007

(86) PCT No.: PCT/EP2007/008701
§ 371 (c)(1),
(2), (4) Date: Jan. 2, 2010

(87) PCT Pub. No.: WO2008/043503
PCT Pub. Date: Apr. 17, 2008

(65) Prior Publication Data
US 2010/0118524 A1    May 13, 2010

(30) Foreign Application Priority Data

Oct. 10, 2006 (DE) .......................... 10 2006 047 874

(51) Int. Cl.
*F21V 21/00* (2006.01)
(52) U.S. Cl. .................. 362/217.01; 362/196; 362/158; 362/645
(58) Field of Classification Search ............. 362/217.01, 362/196, 158, 645, 267
See application file for complete search history.

(56) References Cited

U.S. PATENT DOCUMENTS

| | | | | |
|---|---|---|---|---|
| 4,675,793 A | * | 6/1987 | Capellari et al. | 362/523 |
| 4,907,134 A | * | 3/1990 | Mori | 362/549 |
| 5,225,125 A | | 7/1993 | Wildfeuer | |
| 5,517,395 A | * | 5/1996 | Weissman | 362/363 |
| 5,556,584 A | * | 9/1996 | Yamazaki et al. | 264/46.5 |
| 5,934,799 A | | 8/1999 | Suzuki | |
| 6,241,936 B1 | | 6/2001 | Shimada | |
| 7,585,086 B2 | * | 9/2009 | Vonhoff | 362/217.01 |
| 2002/0085392 A1 | * | 7/2002 | Hajianpour | 362/562 |
| 2007/0108666 A1 | | 5/2007 | Vonhoff | |

FOREIGN PATENT DOCUMENTS

| | | |
|---|---|---|
| DE | 9316979 U1 | 1/1994 |
| DE | 10333980 A1 | 2/2005 |
| FR | 2319843 A | 2/1977 |
| FR | 2411692 A | 7/1979 |
| GB | 2010418 A | 6/1979 |

* cited by examiner

*Primary Examiner* — Evan Dzierzynski
(74) *Attorney, Agent, or Firm* — Gudrun E. Huckett

(57) ABSTRACT

The invention relates to a light (1) especially a wall or ceiling light protected from spray water and used to receive at least one long gas discharge lamp (5), said light comprising a closed housing formed by an at least transparent base part (3) which can be mounted in a fixed location and holds electrical devices, and an at least transparent coupling part (2). The base part (3) and the coupling part (2) are injection-molded from the same charges of thermoplastic material in a common mold which is essentially symmetrical in terms of the injection process, and overlap along peripheral edges on both sides, one edge being an insertion edge (10) and the other edge being embodied as a U-shaped receiving element (9) for receiving the insertion edge (10). According to the invention, taking into consideration the characteristic features of the transparent or translucent plastic material and the requirements of large-scale production, the light is designed in such a way that the U-shaped receiving element (9) comprises a seal (14) consisting of an elastomer foam forming a smooth outer skin, and the inner wall (15) of the light is provided with a surface structure improving the adhesion, for receiving the seal (14).

13 Claims, 3 Drawing Sheets

LIGHT

BACKGROUND OF THE INVENTION

The invention concerns a light, in particular a splash water-protected wall light or ceiling light, for receiving at least one elongate gas discharge lamp. The light comprises a housing that can be assembled in closed form from an at least translucent base part that is stationarily mountable and holds electrical devices and an at least translucent dome part, wherein the base part and the dome part are produced by injection moulding from the same batches of thermoplastic synthetic material in a common mould that is substantially symmetrically designed relative to the injection process. The base part and dome part overlap along circumferentially extending rims provided on both parts, of which one rim is configured as an insertion rim and the other rim is configured as a U-shaped receptacle for the insertion rim. The invention also concerns a method in which the top part and the bottom part are produced simultaneously in parallel cavities of an injection moulding device by a common injection piston and are demoulded after solidification. Such a light and method are disclosed in German patent application DE103 33 980 A1. Lights of this kind that are primarily produced in large-scale production as mass-market products and accordingly are subject with regard to their manufacture and to the material to great cost pressure, can be generally produced by injection moulding from thermoplastic synthetic material, in particular polypropylene. Transparent or at least translucent synthetic materials as they are to be used for light emission of gas discharge lamps and similar elongate lamps however present significant difficulties as a result of their great thermal expansion that call into question proper fit and connection of the housing parts and in particular also the seal-tight connection between both.

For the best possible adaptation of materials of top part and bottom part including the compensation of thermal expansion coefficients, it has already been provided according to the prior art to produce both housing parts simultaneously with a common injection piston or the like injection source in adjacently positioned cavities. Even though, specific measures are needed in order to ensure a seal-tight connection between bottom part and top part under all operating conditions and temperature conditions. However, such configuration must be adapted taking into account the particularities of the material, in the present case an injection-mouldable transparent or translucent thermoplastic synthetic material, and the possibilities of a substantially automated mass production.

SUMMARY OF THE INVENTION

According to the invention, this is solved, based on a light of the aforementioned kind, in that the U-shaped receptacle has a seal made from an elastomer foam that forms a smooth outer skin and that is provided on the inner side with a surface structure that improves adhesion for receiving the seal. The attachment of an elastic seal in a practice-oriented form requires a reliable seat in particular for splash water-protected lights. Loosely insertable seals that already during transport, in any case when exchanging a lamp or in case of other maintenance work, can slide or fall out are therefore precarious. Thermoplastic synthetic materials with satisfactory light transmission as required here provide however, because of their smooth surface, unacceptable adhesion properties for frictional or adhesion-type seals. This is in particular true for polypropylene which represents a material that, as far as transparent synthetic materials are concerned, is relatively inexpensive and can be easily processed by injection moulding but, for the seal configuration, is problematic not only because of its very high thermal expansion but also because of its smooth and repellent surface relative to seals. This is remedied further in accordance with the invention in that at least the part of the inner wall of the U-shaped receptacle that is provided for the seal seat is provided with an adhesion-improving surface structure that makes it suitable as a seal seat. This surface structure can be provided for example by a plasma treatment of the inner surface of the receptacle or at least of contact areas seal by means of a processing step that follows injection moulding and demoulding. Other surface structures are preferably provided already by means of injection moulding, for example, when by means of profilings in the inner surface of the receptacle anchoring possibilities for a seal, in particular seal formed in the receptacle, are provided.

For a simple configuration of the injection moulds and for problem-free demoulding of the injection-moulded parts it is possible to provide profilings that are oriented transversely to an ejection direction and that provide enlarged adhesion and friction surfaces. Profilings that extend transversely to the ejection direction and have an undercut relative to the ejection are to be provided with undercut heights that remain within the elastic deformations of the receptacle so that demoulding can be done by simple ejection from the mould.

The aforementioned object is solved in accordance with the invention also by means of a method wherein as a thermoplastic synthetic material a polypropylene is used and wherein the U-shaped receptacle on the inner side is made adhesive for a seal of a closed-pore polyurethane foam that forms a smooth outer skin by a plasma treatment and is then provided with a sealing bead of polyurethane.

For the sealing actions to be achieved with such a seal by taking into consideration thermal expansion and splash water actions, the cross-sectional geometry of the insertion part and the seal are also important for the interaction. Particularly advantageous is a push-on rim with a (single) projecting web edge that rests under pressure against the seal. This single web edge causes in contrast to a real contact or several adjacently positioned pressure edges a significant deformation of the seal so that the latter is not areally compressed but only within a tightly limited area. Moreover, such a web edge provides the possibility of configuring an excess air chamber at least on one side that, at least for a sufficient time of exposure of the separation area between top part and bottom part to splash water is suitable to catch water and to collect it.

BRIEF DESCRIPTION OF THE DRAWINGS

One embodiment of the invention is illustrated in the drawing and will be explained in the following in more detail. The drawing shows in.

DESCRIPTION OF PREFERRED EMBODIMENTS

Figure 1:
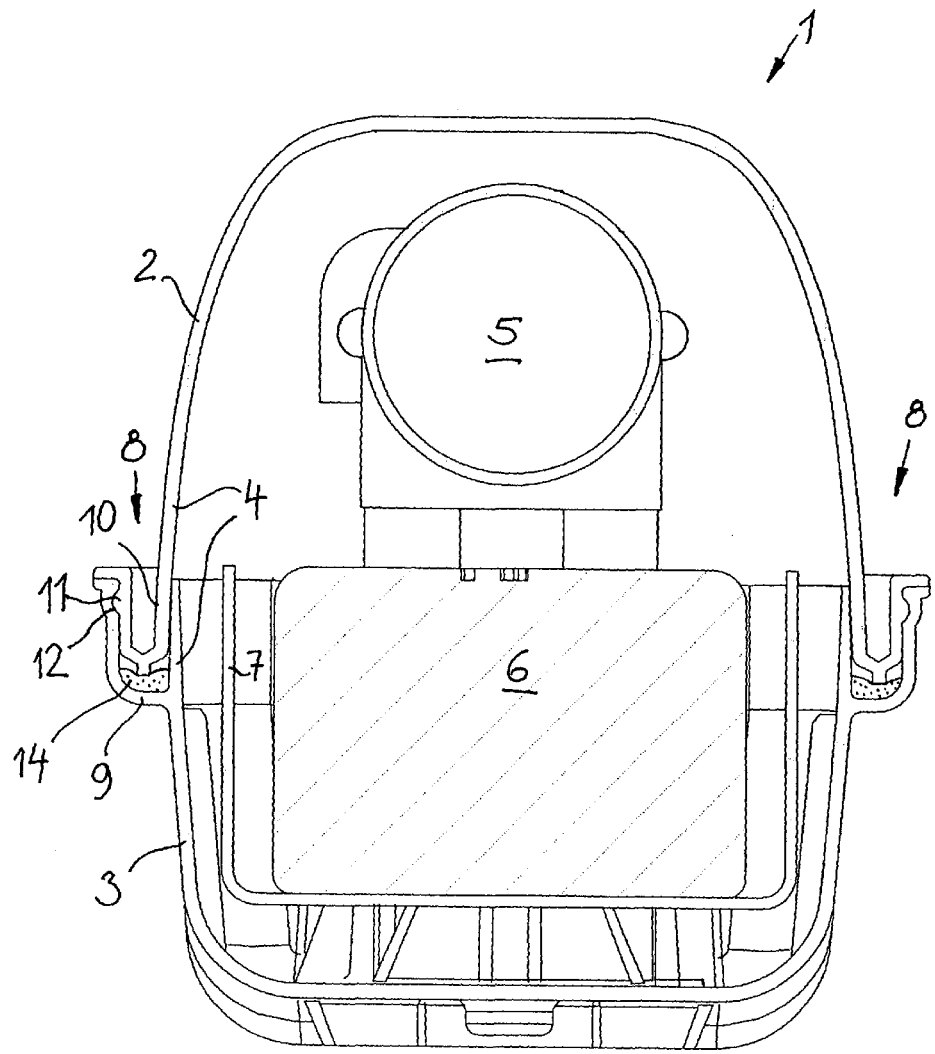
FIG. 1 a cross-section of a light.

A light (1) with the cross-section according to FIG. 1 comprises a housing of an elongate shape, comprised of a dome part (2) and a base part (3) and is referred to generally by 4, for receiving an inwardly positioned gas discharge lamp (5), wherein the housing (4) extends almost across its entire length in a prism shape and is closed off at the ends in a cap-shaped way. The base part (3) receives in addition to the gas discharge lamp (5) also the other (electrical) devices with ballast (6) and a corresponding shield (7) in the area of the ballast for reducing heat radiation from the ballast to the sidewalls of the base part (3). The base part (3) can be attached for a fixed installation of the light on a wall or ceiling while the dome part (2) that is usually not provided with components of the light can be designed to be freely detachable.

Dome part (2) and base part (3) are detachably connected to one another by means of a circumferentially extending locking device (8) where on one side a U-shaped receptacle (9) and on the other side an insertion part (10) are provided that can be inserted into the U-shaped receptacle (9). In the present case, the insertion part (10) forms the rim of the dome part (2) while the receptacle part (9) forms the rim of the base part (3) wherein this assignment is reversible in principle.

Insertion part (10) and receptacle (9) are pressed into one another with pretension wherein formed locking means comprising a locking groove (11) and a locking rib (12) on the receptacle (9) and on the insertion part (10), respectively, with a profiling extending transversely to the insertion direction ensure a fixed seat. A cross-sectional elasticity of the insertion part (10) is provided additionally by formation of an open hollow profile that is open to the rear relative to the insertion direction.

As can be seen in particular in the enlarged detail illustration of the locking device (8), the insertion part (10) has a projecting web edge (13) that is leading in the insertion direction and is provided with the entire locking profile as a monolithic part in the circumferential direction. This web edge (13) engages with a predetermined insertion depth a seal (14) that is inserted into the lowermost (innermost) area of the U-shaped receptacles (9).

In order to ensure a precise and fixed seat of the seal (14) even during transport, extended storage, and during maintenance work, the seal (14) is not simply applied onto the inner wall (15) of the U-shaped receptacle (9) which wall is formed during injection moulding but instead onto a pre-treated inner wall (15) with a surface structure that can be obtained only by means of a plasma treatment, in particular a low-temperature plasma treatment or cold plasma treatment. The plasma treatment can be achieved by means of a corona or high frequency ionization of air or gas; only this enables a good adhesion of an elastomer, such as a polyurethane that produces a closed but also smooth and thus badly adhering outer skin, on surfaces of transparent thermoplastic synthetic materials, in particular transparent polypropylene.

This step is of special importance in order to create and ensure a predetermined fixed seal seat. In particular, when using polypropylene as a transparent or translucent housing, on the one hand, such a plasma treatment is the prerequisite for the incorporation of a seal that is stationary in practice. On the other hand, such a seal (14) is also immensely important in order to provide and maintain a seal-tight connection of base part (3) and dome part (2).

However, for the effectivity of the seal (14) the geometry of the insertion part (10) where the web edge (13) engages the seal (14) is also important. For predetermined pressing forces and engagement depths, an individual web edge causes an especially beneficial deformation of the seal (14) that in cross-section defines a tightly limited sealing area that together with the predetermined maximal pressing action provides the desired closure.

On either side of the web edge (13) (or for a laterally displaced web edge at least on one side) there are air chambers (16, 17) provided that, in particular relative to sporadic splash water exposure, provide an absorption and uptake action in that they catch incoming water and brake water that is possibly sharply impinging like a jet.

As a result, a light of a transparent injection-mouldable material such as polypropylene can be produced in a practice-oriented and optionally splash water-protected configuration when in particular in the sealing area measures are taken that for high thermal expansion of the material and for a smooth surface that is disadvantageous for the introduction of seals special precaution is taken.

In particular when manufacturing a housing (4) of polypropylene it must be taken care already during injection moulding that a dome part (2) and a base part (3) are produced adjacent to one another like twins in a common injection moulding process. After demoulding the inner surface (15) of the U-shaped receptacle (9) can be prepared in a circumferentially performed treatment process with a plasma electrode for receiving subsequently a sealing bead made of a dosed-pore polyurethane.

Figure 2:
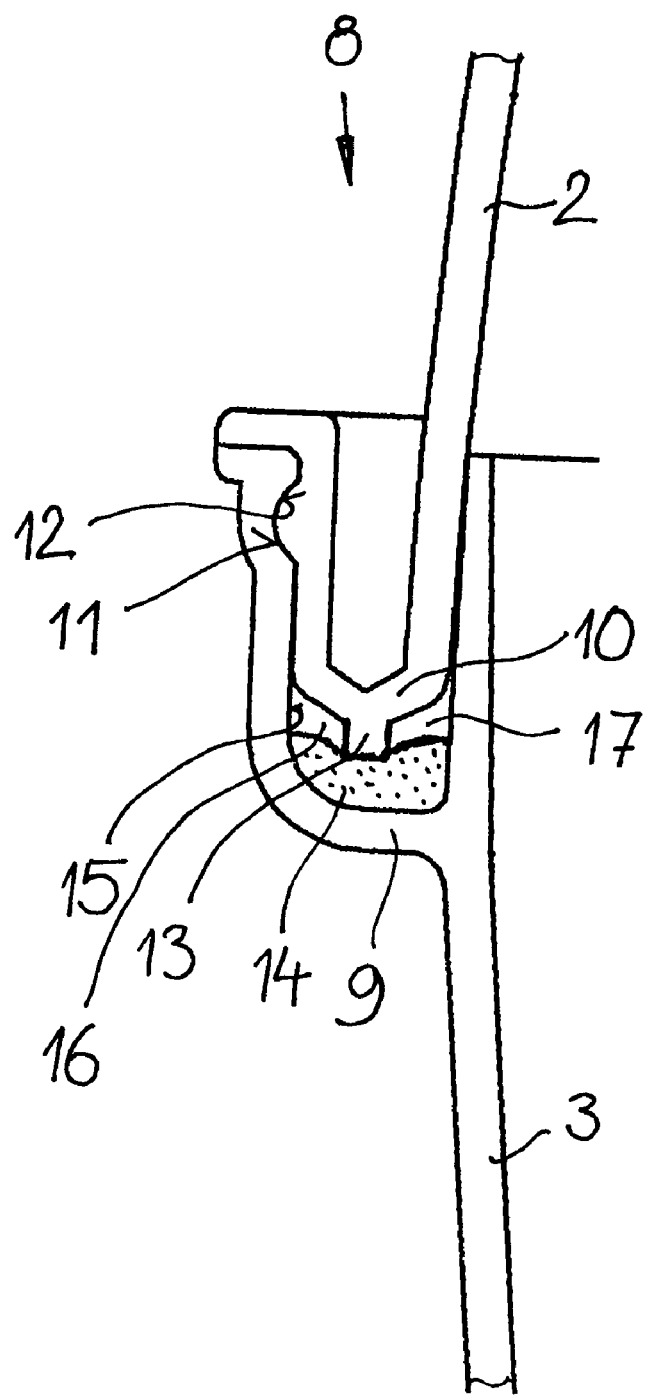
FIG. 2 an enlarged cross-sectional detail of FIG. 1.
Figure 3:
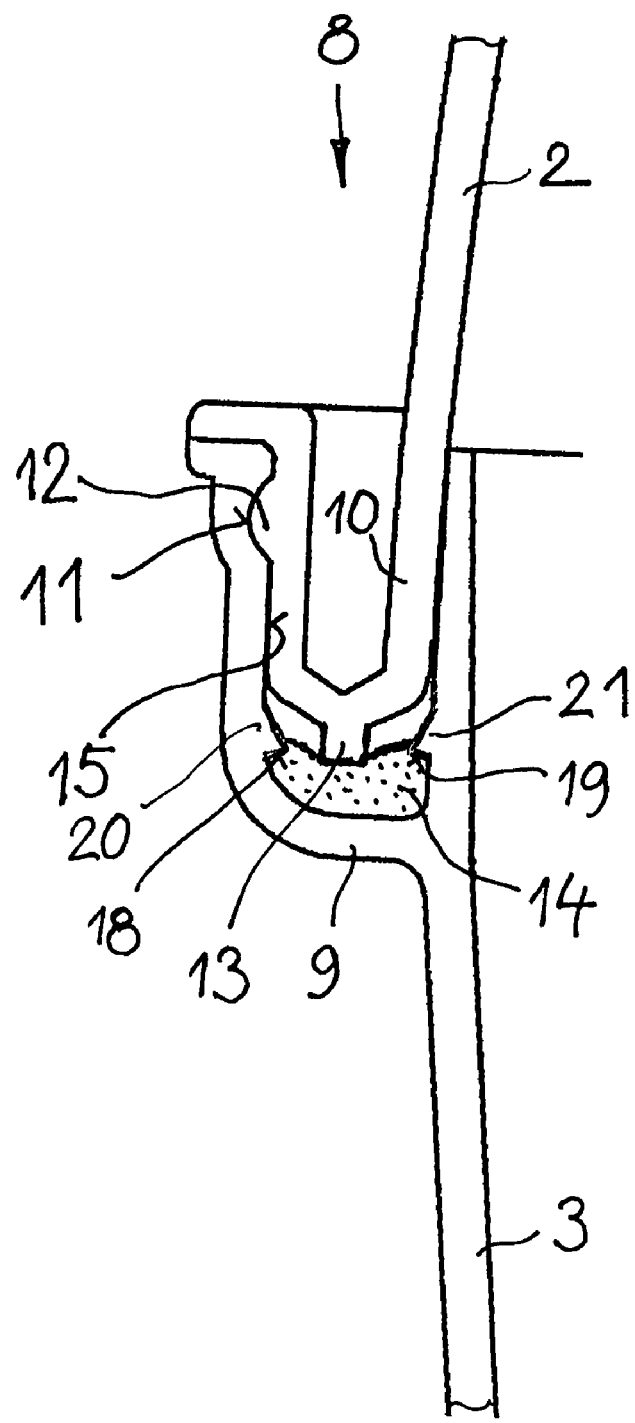
FIG. 3 an enlarged cross-sectional detail according to FIG. 2 of another embodiment.

In FIG. 3 an alternative embodiment is shown in section view in accordance with FIG. 2 which embodiment coincides with the embodiment according to FIGS. 1 and 2 in many details and is thus provided with the same reference numerals as far as those details are concerned. The locking device 8 also has a receptacle 9 and an insertion part 10 wherein the insertion part 10 is also provided with a web edge 13 that engages a seal 14 in the receptacle 9 in a seal-tight way. The embodiment according to FIG. 3 deviates from the afore described one only in regard to two undercut edges 18, 19 and matching ribs 20, 21 that in cross-section 3 are angular and are illustrated relatively large for illustration purposes. The undercut edges face downwardly toward the bottom of the U-shaped receptacle 9 and provide for the seal 14 a positive-locking anchoring action in the receptacle so that the seal 14, made of polyurethane foam and provided with an open, soft and yielding inner structure and a closed smooth outer skin, remains in the predetermined position within the receptacle 9 during transport and mounting and in particular also during future maintenance work as is necessary for exchanging the lamp or the starter elements. In this way, the seal 14 is not only prevented from falling out but from displacement within the receptacle 9, which displacement can lead easily to the closed outer skin becoming damaged and thus to the loss of the sealing action.

The afore considered undercut surfaces 18, 19 and the matching ribs extend in the direction of the profile of the locking device 8 that is configured to extend circumferentially about the edge of the housing parts 2, 3. The seal is also provided so as to extend circumferentially together with the undercut surfaces 18, 19 providing a securing function. In general it is expedient but also sufficient to design the undercut surfaces with a minimal height so that demoulding of the housing part provided with the receptacle 9, i.e., the base part 3 in this connection, can be realized in a fast and simple way by utilizing the elastic deformation of the receptacle 9 during ejection and multi-part moulds are thus not needed for this purpose.

Undercut surfaces and ribs of the kind considered here can of course be provided in multiples. It is also possible that a single rib is sufficient for a one-sided anchoring of the seal.

Surface structures with profiles oriented differently, for example, also with profilings that extend in accordance with the (demoulding and insertion) direction, are in principle suitable to improve the securing action of the seal 14 in the receptacle 9 but they provide only an increased frictional anchoring and not a positive-locking anchoring like the undercut surfaces 18, 19.

What is claimed is:

1. A light for receiving at least one elongate gas discharge lamp, the light comprising:
    a housing comprised of a base part and a dome part that are assembled in closed form, wherein the base part is at least translucent and is adapted to be stationarily mounted and is adapted to contain electrical devices, and wherein the dome part is at least translucent;
    wherein the base part and the dome part are injection-moulded from same batches of thermoplastic synthetic material in a common mould that is substantially symmetrically designed relative to the injection process;
    wherein the base part and the dome part each have circumferentially extending rims, wherein the base part and the dome part overlap one another along the circumferentially extending rims;
    wherein a first one of the circumferentially extending rims is an insertion rim and a second one of the circumferentially extending rims is a U-shaped receptacle, wherein the insertion rim projects into the U-shaped receptacle when the base part and the dome part are assembled in closed form;
    a seal arranged inside the U-shaped receptacle, wherein the seal is an elastomer foam that forms a smooth outer skin, wherein the insertion rim engages with a predetermined insertion depth the seal;
    wherein the U-shaped receptacle has an inner wall provided with a surface structure that improves adhesion for receiving the seal.

2. The light according to claim 1 embodied as a splash water-protected wall light or ceiling light.

3. The light according to claim 1, wherein the thermoplastic synthetic material is polypropylene.

4. The light according to claim 1, wherein the elastomer foam is a polyurethane foam.

5. The light according to claim 1, wherein the surface structure is comprised of a plasma-treated surface.

6. The light according to claim 1, wherein the surface structure comprises a profile structure.

7. The light according to claim 6, wherein the profile structure comprises at least one undercut edge that is recessed within the U-shaped receptacle.

8. The light according to claim 7, wherein the undercut edge has a height that can be overcome upon demoulding by the elasticity of the U-shaped receptacle.

9. The light according to claim 1, wherein the insertion rim has a projecting web edge that rests with pressure against the seal.

10. The light according to claim 9, wherein at least on one side of the web edge, between the insertion rim and the seal, an excess air chamber remains as a buffer relative to splash water.

11. The light according to claim 1, wherein the insertion rim and the U-shaped receptacle each are provided with complementary locking profiles that engage one another, wherein the insertion rim and the U-shaped receptacle form together a circumferentially extending locking device and detachably connect the dome part and the base part to each other.

12. The light according to claim 11, wherein the insertion rim in cross-section is provided with a hollow U-shaped profile that, relative to the insertion direction, is open in a direction facing away from the U-shaped receptacle.

13. A method for producing a light according to claim 1, the method comprising the steps of:
    injection-moulding from polypropylene the top part and the bottom part of the light simultaneously in parallel cavities of an injection moulding device by a common injection piston;
    demoulding after solidification of the polypropylene the top part and the bottom part;
    treating the inner side of the U-shaped receptacle by a plasma treatment to make the inner side adhesive for a closed-pore polyurethane foam seal with a smooth outer skin; and
    applying a sealing bead of polyurethane forming the closed-pore polyurethane seal with a smooth outer skin.

* * * * *